Figure 1:
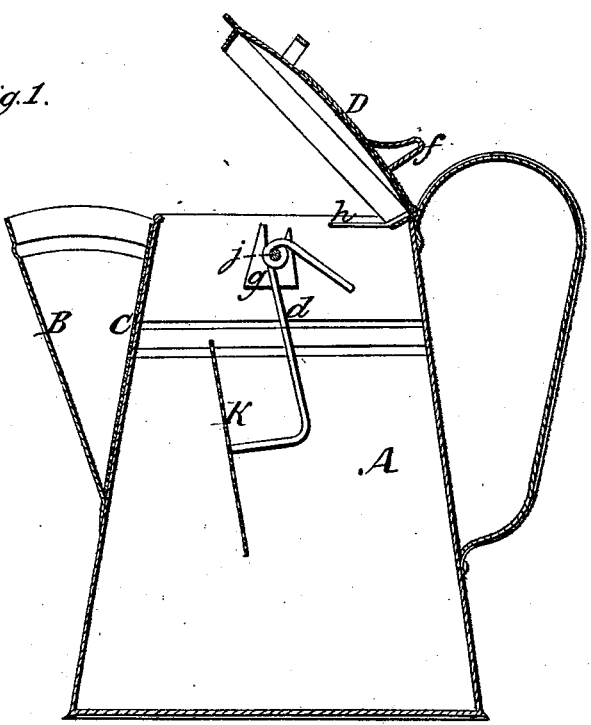
Figure 2:
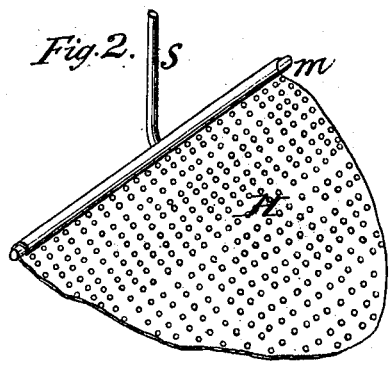

S. McGuffin.

Coffee Pot.

N° 77,507. Patented May 5, 1868.

Witnesses.
A. D. Stockbridge
A. A. Yeatman

Inventor.
S. McGuffin
her
Alexander A. Mason
Atty

United States Patent Office.

SHANNON McGUFFIN, OF RISING SUN, INDIANA.

Letters Patent No. 77,507, dated May 5, 1868.

IMPROVEMENT IN COFFEE AND TEA-POTS.

The Schedule referred to in these Letters Patent and making part of the same.

TO ALL WHOM IT MAY CONCERN:

Be it known that I, SHANNON McGUFFIN, of Rising Sun, in the county of Ohio, and in the State of Indiana, have invented certain new and useful Improvements in Coffee and Tea-Pots; and do hereby declare that the following is a full, clear, and exact description thereof, reference being had to the accompanying drawings, and the letters of reference marked thereon. In the annexed drawings, making a part of this specification—

A represents an ordinary tea or coffee-pot, made of any desired material, size, or style. The tea-pot A is provided with ears or bearings $g$, on or in which I adjust a rod or shaft, $j$. The bearings $g$ are made near the top and middle of the tea-pot, as shown, and open at the top, so as to readily admit of the adjustment of a movable strainer, K.

K represents an adjustable and movable strainer made of perforated metal or gauze wire, and attached in its centre, D, to a swinging rod or wire, $d$. The strainer K may be of any desired shape, so as to fit against the tea-pot, over the mouth of the spout thereof, and is for the purpose of keeping said spout from clogging up with the sediment or "grounds," and that the liquid poured from the said vessel or tea-pot A may be perfectly clear and free from solid matter.

The swinging-rod or wire $d$ is rigidly secured to the rod or shaft $j$, and has an arm projecting backward therefrom, as shown, which is operated by a projecting arm, $h$. The rod $d$, when forced or operated by the projection $h$, throws the strainer K down against the side of the tea-pot, and holds it there as long as may be desired.

D represents the lid of the tea or coffee-pot hinged thereto in the usual manner, and provided with a bent wire or lever, $h$, projecting down at an angle therewith, which strikes the arm of the bent swinging rod $d$ as the lid is closed, and holds the strainer K in place. The lid D is provided also with a projection from its upper side, as seen at $f$, which affords a convenient handle or thumb-rest by which the lid is raised, and also a rest for the lid against the handle of the tea-pot, to keep from breaking the hinge when open.

B represents the lip or spout of the vessel A when used as a coffee-pot, and C represents an adjustable strainer secured therein. The strainer C is made triangular in form, and just so as to fit between the sides of the lip or spout B, and rest against the outside of the vessel A.

The strainer C is made adjustable, so that it may be removed readily for the purpose of cleansing.

H represents another semicircular strainer, which is designed more particularly to be used with the coffee-pot, and made of any suitable perforated material.

The strainer H is secured to a rod or shaft, $m$, which is made just so as to fit and work in the rests $g$, where it may be adjusted at pleasure.

Attached to the shaft $m$, and extending at right angles with the strainer H, is an arm, S, which is operated by the projecting arm or lever $h$ of the lid.

By the above-described device, all or any of the strainers may be removed and cleansed at pleasure, or one exchanged for another, as may be desired.

Having thus fully described my invention, what I claim as new, and desire to secure by Letters Patent, is—

Providing a "coffee" or "tea-pot" A with a swinging and adjustable strainer, substantially as and for the purpose herein specified.

In testimony that I claim the foregoing, I have hereunto set my hand, this 14th day of February, 1868.

SHANNON McGUFFIN.

Witnesses:
R. A. P. BUCHANAN,
R. L. DAVIS.